(No Model.)
F. BRIELMAIR.
STOVE.
No. 340,278. Patented Apr. 20, 1886.
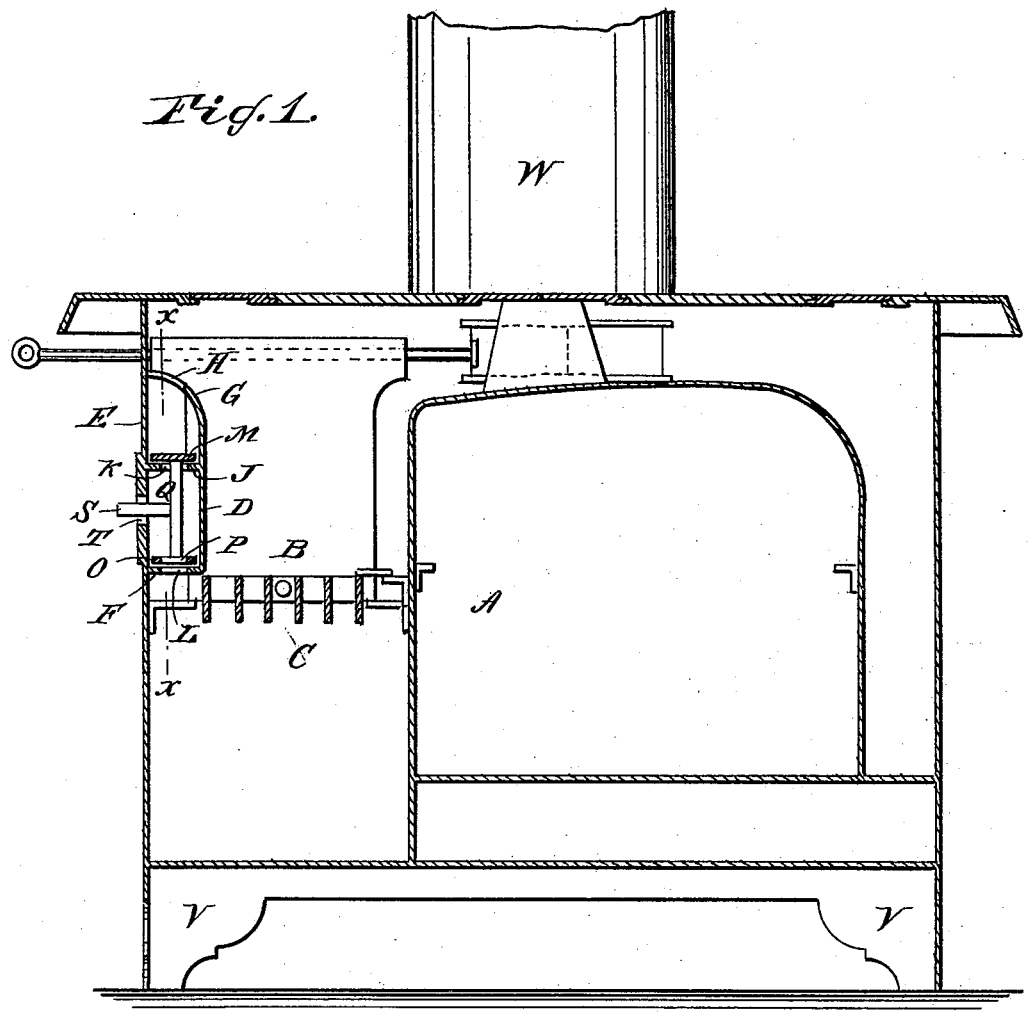
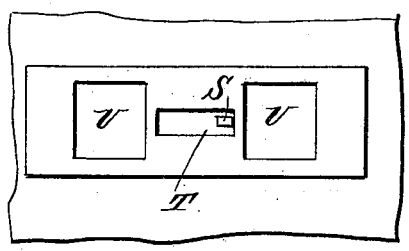
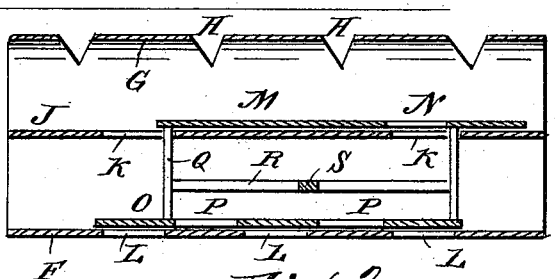
WITNESSES:
Theo. G. Hoster
C. Sedgwick
INVENTOR:
F. Brielmair
BY Munn & Co
ATTORNEYS.

UNITED STATES PATENT OFFICE.

FRANK BRIELMAIR, OF NASHVILLE, TENNESSEE.

STOVE.

SPECIFICATION forming part of Letters Patent No. 340,278, dated April 20, 1886.

Application filed April 17, 1885. Serial No. 162,564. (No model.)

*To all whom it may concern:*

Be it known that I, FRANK BRIELMAIR, of Nashville, county of Davidson, Tennessee, have invented a new and useful Improvement in Stoves, of which the following is a full, clear, and exact description.

The object of my invention is to provide certain new and useful improvements in stoves, whereby the draft can be regulated perfectly.

The invention consists in the construction, arrangement, and combination of parts and details, as will be fully set forth and described hereinafter.

Reference is to be had to the accompanying drawings, forming part of this specification, in which similar letters of reference indicate corresponding parts in all the figures.

Figure 1 is a longitudinal sectional elevation of a cooking-stove provided with my improvement. Fig. 2 is an outside view of the register. Fig. 3 is a longitudinal sectional elevation of the same.

The stove A is provided with the fire-box B, having the usual grate, C. A short distance from the outer sides, E, of the fire-box the upright longitudinal partition or fire-wall D is erected in the same, which is connected at the grate by a horizontal bottom, F, with the side E of the fire-box, the top of the partition D being inclined toward and connected with the side E and provided in its curved top G with apertures H. A transverse partition, J, provided with a series of apertures, K, connects the side E with the partition D at about the middle of its height. Apertures L are formed in the bottom F.

A plate, M, having an aperture, N, slides on the partition J, and a plate, O, having apertures P, slides on the bottom F, which plates M and O are connected by rods Q, which in turn are connected by a bar, R, from which a bar, S, projects through a slot, T, in the side E, at each end of which slot an opening, U, is formed.

When the aperture N in the slide M registers with an aperture, K, of the partition J, the slide O closes the apertures L in the bottom F, and the draft passes through the space between the side E and partition D, through the top openings, H, over the fire, and to the smoke-pipe W.

When the apertures P in the slide O register with the apertures L in the bottom F, the slide M closes the apertures K in the partition J, and the draft passes down between the side E and partition D and under the grate.

The slides M and O can easily be shifted by means of the bar S.

The legs V are cast integral with the sides of the stove.

Having thus described my invention, I claim as new and desire to secure by Letters Patent—

1. The combination, with a stove, of a partition or fire-wall on one side of the fire-box, between which partition and the outer wall of the fire-box a compartment is formed within the fire-box, slides within the compartment formed by said wall of the fire-box and said partition, and a perforated outer casing, through which a lug on the slide passes, the above-mentioned partition being provided with apertures at its top and bottom, substantially as herein shown and described.

2. The combination, with the stove A, having apertures U in its side, of the partition D, the bottom F, having apertures L, the partition J, having apertures K, and the connected apertured sliding plates O and M on the bottom F, and partition J, substantially as herein shown and described.

3. The combination, with the stove A, having apertures U and a slot, T, in its side E, of the partition D, the bottom having apertures L, the partition J, having apertures K, the apertured slides O and M, the rods Q, and the bars R S, substantially as herein shown and described.

FRANK BRIELMAIR.

Witnesses:
W. C. JORDAN,
J. H. ZARECOR.